March 24, 1936.  N. SCHWARTZ  2,035,097

SEPARATOR FOR FILTER TYPE RESPIRATORS OR THE LIKE

Filed June 22, 1935

INVENTOR.
Nathan Schwartz
BY
Clark & Ott
ATTORNEYS

Patented Mar. 24, 1936

2,035,097

UNITED STATES PATENT OFFICE 2,035,097

SEPARATOR FOR FILTER TYPE RESPIRATORS OR THE LIKE

Nathan Schwartz, New York, N. Y.

Application June 22, 1935, Serial No. 27,947

8 Claims. (Cl. 183—44).

This invention relates to a separator which is particularly applicable to filter type respirators, gas masks, or similar devices for protecting the wearer against the inhalation of air laden with dust, fumes, gases or other harmful substances.

The invention broadly aims to provide an improved separator of a minimum size and weight, while affording a maximum area of filtration and which is so constructed and arranged as to facilitate the changing of the filter unit.

More specifically the invention resides in an improved separator including a hollow body of semi-flexible elastic material and a filter unit detachably associated therewith to provide a receiving chamber for the filtered or purified air from which chamber said air is adapted to be drawn into the respirator mask, the body being fashioned to provide contractile means for removably holding the filter unit in assembled relation therewith and for sealing the same so as to insure the passage of the air through the filtering element to the air receiving chamber.

With the above and other objects in view, the invention is set forth more particularly in the specification and drawing and pointed out in the appended claims.

Figure 1:
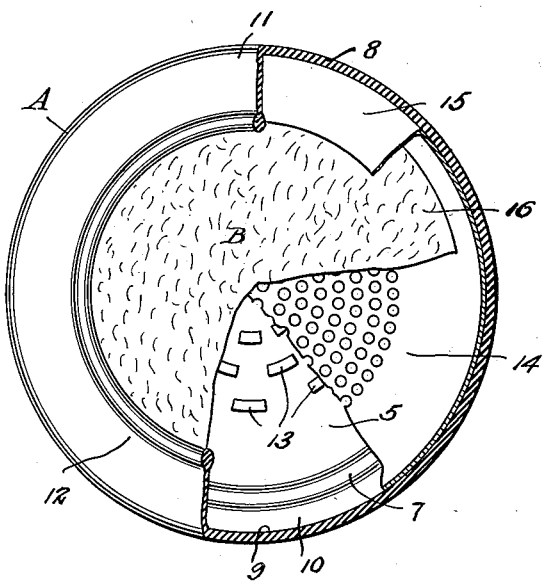
Fig. 1 is a front view of a separator constructed in accordance with the invention, parts being broken away to show the underlying structure.

Referring to the drawing by characters of reference, A designates generally a hollow body or casing of semi-flexible elastic material, such as molded rubber which includes a rear or inner wall 5 formed with an air outlet 6 and an outwardly or forwardly directed marginal rim 7 provided at its free edge with a circumferentially arranged channeled bead 8 defining an internal annular groove 9 between the inner and outer walls 10 and 11 of the bead. Preferably the outer wall 11 is provided with a radial inwardly extending annular flap or flange 12 protruding beyond the inner wall 10. The forward or inner surface of the rear or inner wall 5 is formed with a plurality of ribs 13, the purpose of which will be hereinafter set forth.

The separator further includes a filter unit, designated generally by the reference character B, which is removably fitted within the groove 9 of the bead 8 and said filter unit comprises a rigid foraminous disc 14 which is of a greater diameter than the normal diameter of the grooved portion of the bead thereby effecting an expansion of the body A when emplaced therein and placing the rim and bead portions of the body under tension to hold the filter unit in place and to insure an effective sealing thereof.

Figure 2:
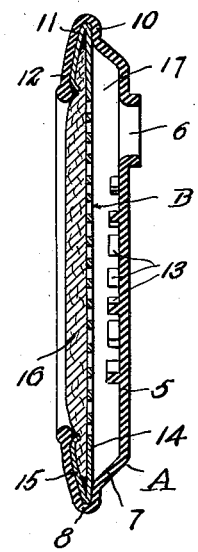
Fig. 2 is a medial transverse section therethrough.
Figure 3:
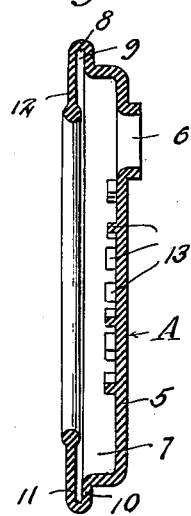
Fig. 3 is a sectional view similar to Fig. 2 through the body of the separator with the filter unit removed.

In the form of the invention disclosed in Figs. 1 and 2, the foraminous disc 14 is provided with an inturned annular flange 15 which serves to clinch and retain a filter element 16 arranged over the outer surface of the disc. The flap or flange 12 constituting an extension of the outer wall 11 of the bead, due to its inherent elasticity, is impinged throughout its width over the outer surface of the flange 15 of the disc 14 and further guards against any possibility of leakage of air around the margin of the filter unit B thereby insuring the passage of the air through the filter element 16 to the space 17 between the disc 14 and the rear and marginal walls 5 and 7 of the body A which constitutes a receiving chamber for the filtered or purified air which is adapted to be drawn therefrom through the outer opening 6 into the respirator mask.

In order to preclude cutting off of any portion of the filtration area by contact of the rear wall 5 with the rear surface of the disc, due to distortion of said rear wall 5 when the device is in use, the ribs 13 are utilized as a means for engaging and spacing the inner surface of the rear wall 5 from the disc.

Figure 4:
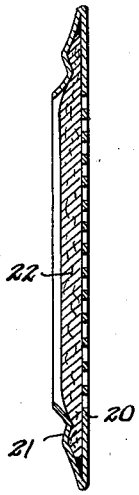
Fig. 4 is a similar sectional view showing a modified form of the invention.

In the form of the invention shown in Fig. 4 of the drawing, the filter unit includes a foraminous disc 20 having an inturned resilient marginal flange 21 which is adapted to be sprung outwardly to permit of the removal and changing of the filter element 22 after the filter element has become clogged or otherwise unfit for further use.

Figure 5:
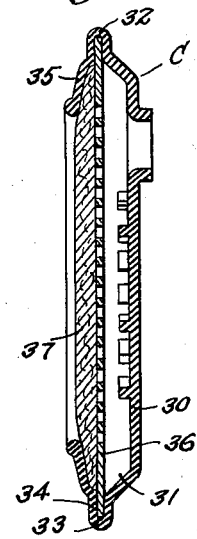
Fig. 5 is a similar view of a further modification.

In the form of the invention illustrated in Fig. 5 of the drawing, the body C which is constructed of a semiflexible elastic material, such as molded rubber, includes a rear wall 30, a marginal rim 31 provided at its free edge with a circumferential channeled bead 32 defining an internal groove 33. In this form of the invention, the outer wall 34 of the bead 32 is provided with an offset annular radial inwardly extending flap or flange 35 and a rigid foraminous disc 36 is emplaced in the groove 33 of the bend 32 and normally remains therein as a part of the body C, while a filter element 37 is removably positioned over the outer surface of the disc 36 and held in place by means of the flap 35 so that the same may be changed without the necessity of removing the disc.

What is claimed is:

1. A separator for filter type respirators including a hollow body of semi-flexible elastic material having an inner wall formed with an air outlet and an outwardly directed marginal rim provided at its free edge with a circumferential channeled bead defining an internal groove, and a filter unit removably fitted within the grooved portion of said bead covering the open outer side of the body and defining, within the body, an air chamber, said filter unit comprising a rigid foraminous wall having a filtering material covering the outer surface thereof and with which foraminous wall the grooved bead is contractively engaged to seal and retain the same in place.

2. A separator for filter type respirators including a hollow body of semi-flexible elastic material having an inner wall formed with an air outlet and an outwardly directed marginal rim provided at its free edge with a circumferential channeled bead defining an internal groove, and a filter unit removably fitted within the grooved portion of said head covering the open outer side of the body and defining, within the body, an air chamber, said filter unit comprising a rigid foraminous wall having a filtering material covering the outer surface thereof and with which foraminous wall the grooved bead is contractively engaged to seal and retain the same in place, and means on the inner surface of the inner wall of the body adapted to contact with the foraminous wall of the filter unit upon distortion of said body to hold the same in spaced relation to the foraminous wall.

3. A separator for filter type respirators including a hollow body of molded semi-flexible elastic material having an inner wall formed with an air outlet and an outwardly directed marginal rim, a channeled bead at the free edge of said rim defining an internal groove having inner and outer walls, an inwardly directed annular flap carried by the outer wall of the groove and constituting an extension thereof, a filter unit comprising a rigid foraminous wall and a filtering material secured to the outer surface of said filter unit wall, said filter unit removably fitted within the grooved portion of the bead with the flap impinged against the outer surface thereof and sealed and secured in place by the contraction of the bead thereabout.

4. A separator for filter type respirators including a hollow body of molded semi-flexible elastic material having an inner wall formed with an air outlet and an outwardly directed marginal rim, a channeled bead at the free edge of said rim defining an internal groove having inner and outer walls, an inwardly directed annular flap carried by the outer wall of the groove and constituting an extension thereof, a filter unit comprising a rigid foraminous wall and a filtering material detachably associated with the outer surface of said foraminous wall, said filter unit removably fitted within the grooved portion of the bead with the flap impinged against the outer surface thereof and sealed and secured in place by the contraction of the bead thereabout.

5. A displaceable filter unit for a separator for filter type respirators comprising a foraminous supporting element having an inturned marginal flange and a filtering material covering said element and secured thereto at the marginal edge thereof by said inturned marginal flange.

6. A displaceable filter unit for a separator for filter type respirators comprising a foraminous supporting element, a filtering material covering said element and means at the marginal edge of said supporting element for detachably securing said filtering material to said element at the marginal edge thereof.

7. A displaceable filter unit for a separator for filter type respirators comprising a hollow body of semi-flexible elastic material having an intake and an outlet, an internal grooved portion adjacent the intake having inner and outer walls, an inwardly directed annular flap carried by the outer wall of the groove and constituting an extension thereof, and filtering means including a rigid foraminous wall removably fitted within the grooved portion and secured in place by the contraction of said grooved portion thereabout and a filtering material covering the outer surface of the foraminous wall and detachably held in associated relation therewith by the inwardly directed annular flap.

8. A separator for filter type respirators including an elastic body having an intake provided with an inwardly directed marginal resilient flap framing the intake, and filtering means including a foraminous supporting wall removably fitted within the body behind the intake and a filtering material covering the outer surface of said foraminous supporting wall and detachably held in associated relation therewith by the inwardly directed marginal resilient flap.

NATHAN SCHWARTZ.